US012671879B2

(12) United States Patent
Shibata

(10) Patent No.: US 12,671,879 B2
(45) Date of Patent: Jun. 30, 2026

(54) IMAGE CAPTURE APPARATUS, CONTROL METHOD THEREFOR, IMAGE PROCESSING APPARATUS, AND IMAGE PROCESSING SYSTEM

(71) Applicant: CANON KABUSHIKI KAISHA, Tokyo (JP)

(72) Inventor: Toshihiro Shibata, Aichi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 71 days.

(21) Appl. No.: 18/934,878

(22) Filed: Nov. 1, 2024

(65) Prior Publication Data

US 2025/0063237 A1 Feb. 20, 2025

Related U.S. Application Data

(63) Continuation of application No. 17/887,717, filed on Aug. 15, 2022, now Pat. No. 12,167,106.

(30) Foreign Application Priority Data

Jan. 1, 2022 (JP) ................................ 2022-000006

(51) Int. Cl.
*H04N 21/84* (2011.01)
*G06F 16/583* (2019.01)
(Continued)

(52) U.S. Cl.
CPC ........... *H04N 21/84* (2013.01); *G06F 16/583* (2019.01); *G06T 13/20* (2013.01);
(Continued)

(58) Field of Classification Search
CPC ............... H04N 21/84; H04N 1/32106; H04N 1/32128; H04N 21/85406; H04N 23/667;
(Continued)

(56) References Cited

U.S. PATENT DOCUMENTS

| | | | |
|---|---|---|---|
| 11,297,260 | B1 | 4/2022 | Siu |
| 2010/0329552 | A1 | 12/2010 | Yim |

(Continued)

FOREIGN PATENT DOCUMENTS

| | | | |
|---|---|---|---|
| JP | 2005057635 | A | 3/2005 |
| JP | 2005075633 | A | 3/2005 |

(Continued)

OTHER PUBLICATIONS

Japanese Office Action, which is enclosed without an English Translation, that issued in Japanese Patent Application No. 2022-000006.

*Primary Examiner* — Shahbaz Nazrul
(74) *Attorney, Agent, or Firm* — Cowan, Liebowitz & Latman, P.C.

(57) ABSTRACT

An image capture apparatus obtains image data captured using an image sensor and then generates, as metadata, information relating to a state of the image capture apparatus at the time of capturing the image data as well as to the image data. The image capture apparatus comprises a first output circuit for outputting the image data in a first format to an external apparatus and a second output circuit for outputting a part of the metadata in a second format to the external apparatus. The second output circuit is from the first output circuit.

15 Claims, 13 Drawing Sheets

(51) Int. Cl.

| | |
|---|---|
| ***G06T 13/20*** | (2011.01) |
| ***H04N 1/32*** | (2006.01) |
| ***H04N 21/854*** | (2011.01) |
| ***H04N 23/667*** | (2023.01) |
| ***H04N 101/00*** | (2006.01) |

(52) U.S. Cl.
CPC ..... *H04N 1/32106* (2013.01); *H04N 1/32128* (2013.01); *H04N 21/85406* (2013.01); *H04N 23/667* (2023.01); *H04N 2101/00* (2013.01); *H04N 2201/3226* (2013.01); *H04N 2201/3247* (2013.01); *H04N 2201/3252* (2013.01)

(58) Field of Classification Search
CPC ....... H04N 2101/00; H04N 2201/3226; H04N 2201/3247; H04N 2201/3252; H04N 21/435; G06F 16/583; G06T 13/20
See application file for complete search history.

(56) References Cited

U.S. PATENT DOCUMENTS

| | | | | |
|---|---|---|---|---|
| 2018/0054646 | A1* | 2/2018 | Lavoie ............... | H04N 21/4183 |
| 2020/0193935 | A1 | 6/2020 | Van De Kerkhof | |
| 2022/0094850 | A1* | 3/2022 | Morita ................. | H04N 23/635 |
| 2025/0252702 | A1* | 8/2025 | Funada ................ | H04N 23/661 |

FOREIGN PATENT DOCUMENTS

| | | | |
|---|---|---|---|
| JP | 2005102155 | A | 4/2005 |
| JP | 2005-223570 | A | 8/2005 |
| JP | 2008054155 | A | 3/2008 |
| JP | 2014175701 | A | 9/2014 |
| JP | 2019-075633 | A | 5/2019 |
| WO | 2021044692 | A | 3/2021 |

* cited by examiner

FIG. 4A

| CATEGORY | DETAIL |
|---|---|
| MANAGEMENT INFORMATION | TimeCode |
| | RECORDING RESOLUTION |
| | HORIZONTAL RECORDING RESOLUTION |
| | VERTICAL RECORDING RESOLUTION |
| | FRAME RATE |
| | RECORDING FRAME RATE |
| | PLAYBACK FRAME RATE |
| LENS INFORMATION | OBJECT DISTANCE |
| | FOCAL LENGTH |
| | FIELD OF VIEW |
| | VERTICAL FIELD OF VIEW |
| | HORIZONTAL FIELD OF VIEW |
| EXPOSURE INFORMATION | T NUMBER |
| | SHUTTER |
| CAMERA ATTITUDE INFORMATION | ANGULAR VELOCITY |
| | ANGULAR VELOCITY AROUND Pitch AXIS |
| | ANGULAR VELOCITY AROUND Yaw AXIS |
| | ANGULAR VELOCITY AROUND Roll AXIS |
| | ACCELERATION |
| | ACCELERATION AROUND Pitch AXIS |
| | ACCELERATION AROUND Yaw AXIS |
| | ACCELERATION AROUND Roll AXIS |
| FACIAL DETECTION INFORMATION | POSITION OF ENTRANCE PUPIL |

FIG. 5

```
{
  “timecode” : “00:00:01:15”,
  “t_number” : 1500,
  “shutter” : 5300
  “object_distance” : 0,
  “focal_length” : 24,
  “fov” : {
    “vertical” : 120,
    “horizontal” : 200,
  },
  “resolution” : [1920, 1080],
  “frame_rate” : {
    “capture” : 60,
    “playback” : 59.94,
  },
  “gyro” : [20, -500, 10],
  “accel” : [800, 10, -20],
  “EntPupilPos” : 190
  }
```

START

S600

IS INPUT FROM
FIRST INPUT CIRCUIT?

NO

YES

S601

OBTAIN IMAGE DATA FROM
FIRST INPUT CIRCUIT

S602

OBTAIN METADATA USED FOR
REAL-TIME COMPOSITION
PROCESSING FROM
SECOND INPUT CIRCUIT

SYNCHRONIZE
IMAGE DATA AND METADATA S603

GENERATE CG S604

COMPOSITE CG S605

DISPLAY COMPOSITE VIDEO S606

END

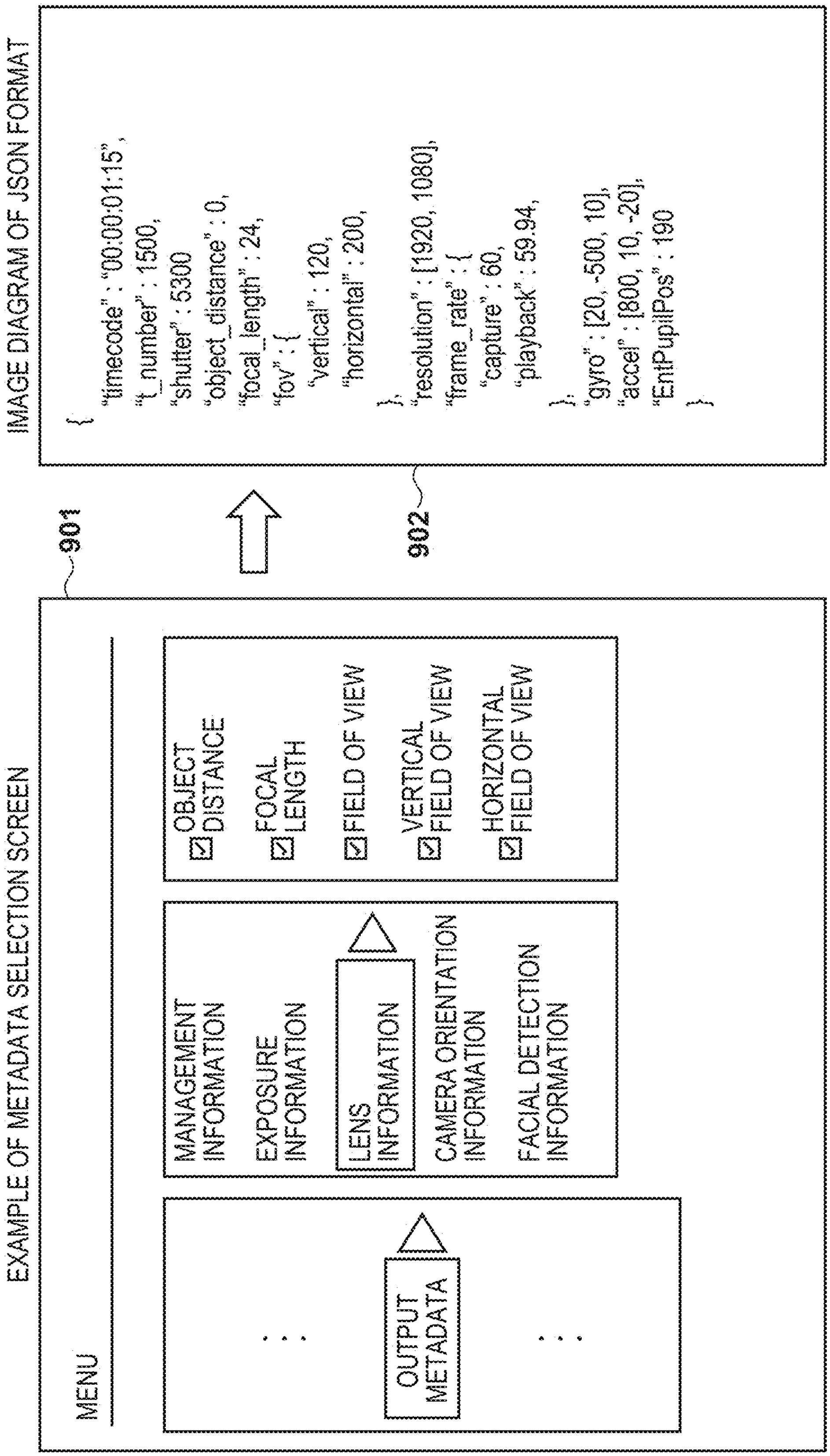

FIG. 9A

EXAMPLE OF METADATA SELECTION SCREEN

IMAGE DIAGRAM OF JSON FORMAT

901

902

MENU

OUTPUT METADATA

MANAGEMENT INFORMATION

EXPOSURE INFORMATION

LENS INFORMATION

CAMERA ORIENTATION INFORMATION

FACIAL DETECTION INFORMATION

☑ OBJECT DISTANCE

☑ FOCAL LENGTH

☑ FIELD OF VIEW

☑ VERTICAL FIELD OF VIEW

☑ HORIZONTAL FIELD OF VIEW

```
{
  "timecode" : "00:00:01:15",
  "t_number" : 1500,
  "shutter" : 5300
  "object_distance" : 0,
  "focal_length" : 24,
  "fov" : {
    "vertical" : 120,
    "horizontal" : 200,
  },
  "resolution" : [ [1920, 1080],
  "frame_rate" : {
    "capture" : 60,
    "playback" : 59.94,
  },
  "gyro" : [20, -500, 10],
  "accel" : [800, 10, -20],
  "EntPupilPos" : 190
}
```

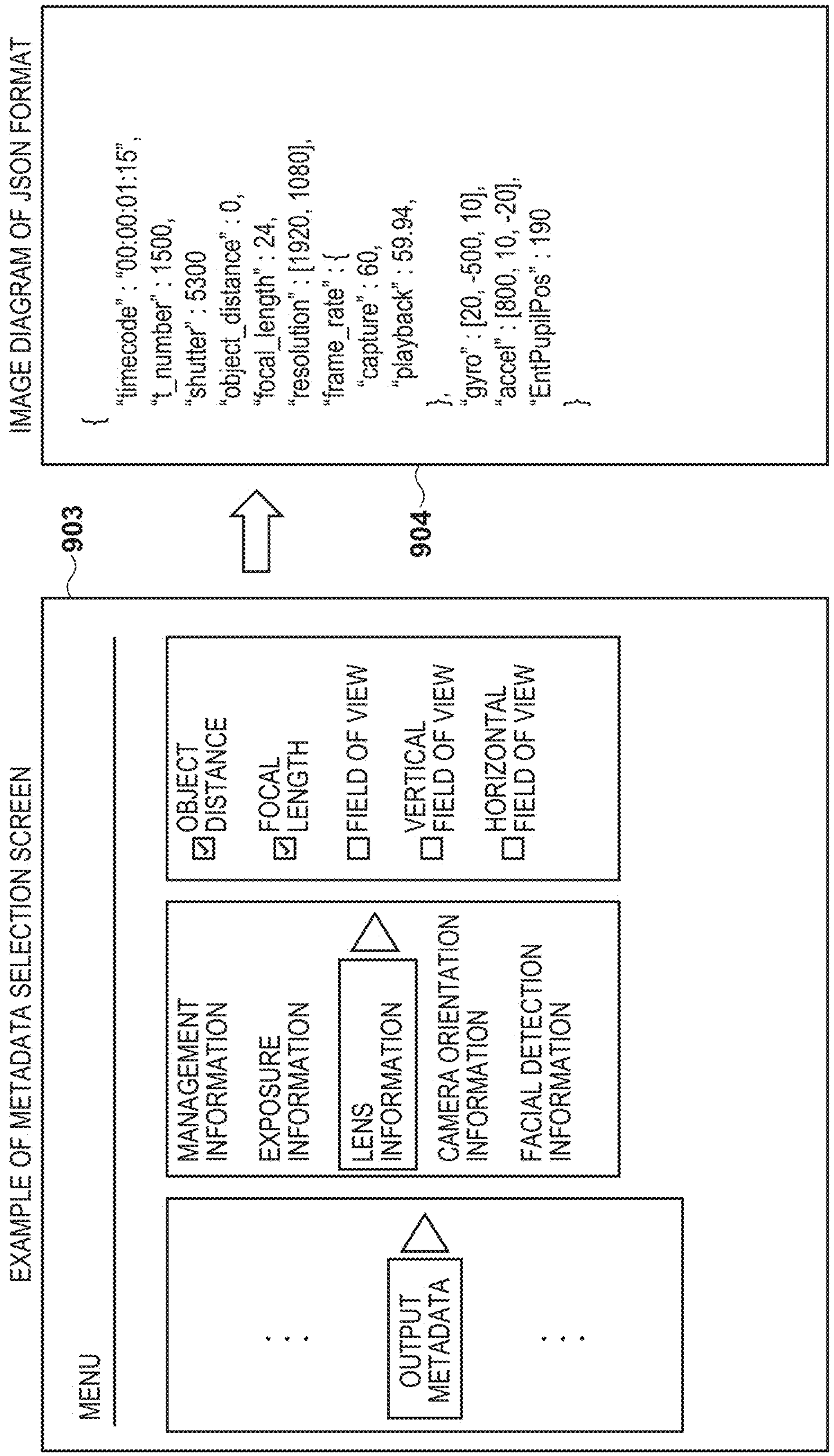

F I G. 9B

EXAMPLE OF METADATA SELECTION SCREEN

903

IMAGE DIAGRAM OF JSON FORMAT

904

MENU

- · · ·
- OUTPUT METADATA △

- MANAGEMENT INFORMATION
- EXPOSURE INFORMATION
- LENS INFORMATION △
- CAMERA ORIENTATION INFORMATION
- FACIAL DETECTION INFORMATION

- ☑ OBJECT DISTANCE
- ☑ FOCAL LENGTH
- ☐ FIELD OF VIEW
- ☐ VERTICAL FIELD OF VIEW
- ☐ HORIZONTAL FIELD OF VIEW

```
{
  "timecode" : "00:00:01:15",
  "t_number" : 1500,
  "shutter" : 5300,
  "object_distance" : 0,
  "focal_length" : 24,
  "resolution" : [1920, 1080],
  "frame_rate" : {
    "capture" : 60,
    "playback" : 59.94,
  },
  "gyro" : [20, -500, 10],
  "accel" : [800, 10, -20],
  "EntPupilPos" : 190
}
```

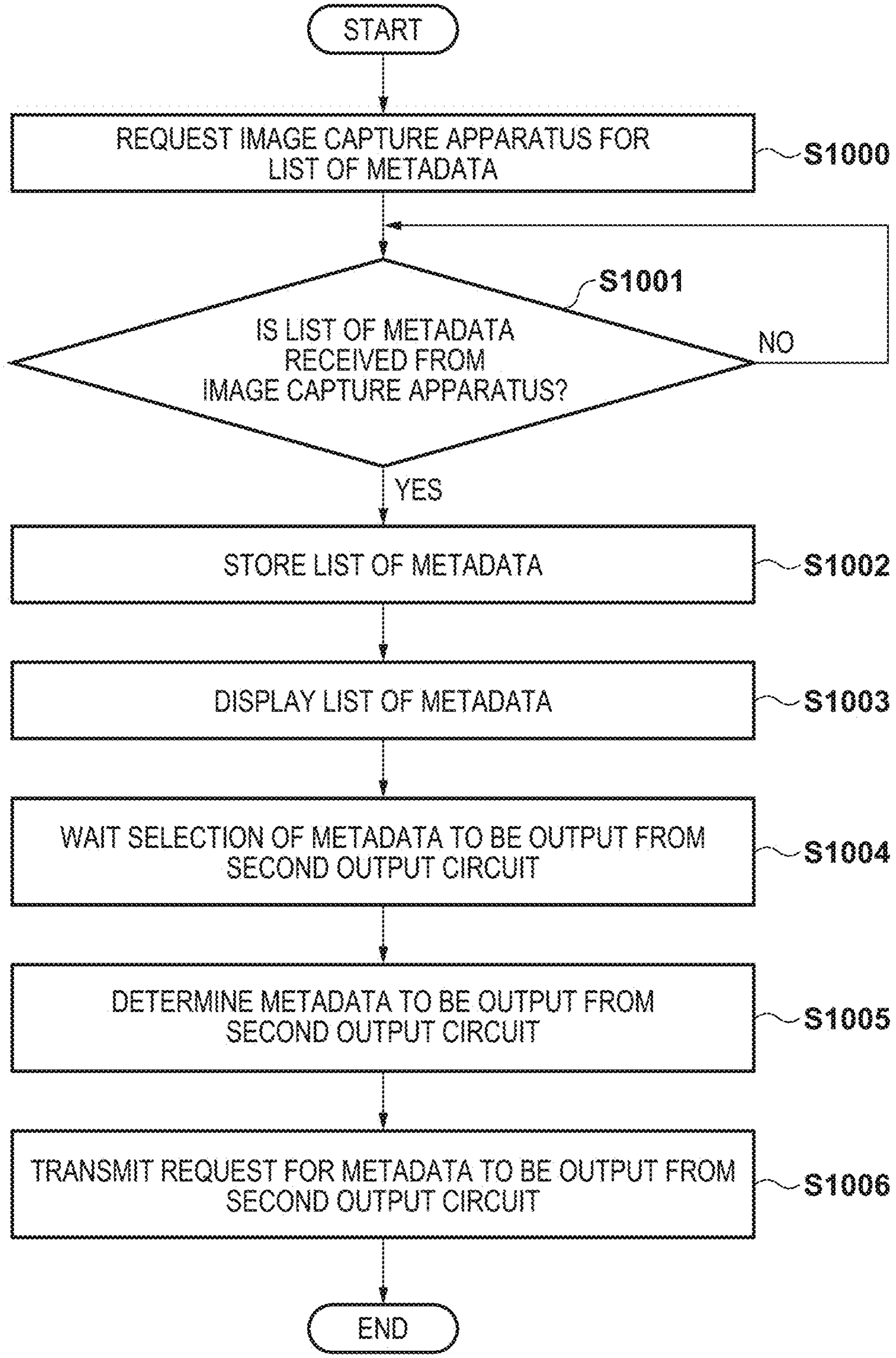

FIG. 10A

START

REQUEST IMAGE CAPTURE APPARATUS FOR LIST OF METADATA — S1000

IS LIST OF METADATA RECEIVED FROM IMAGE CAPTURE APPARATUS? — S1001

NO

YES

STORE LIST OF METADATA — S1002

DISPLAY LIST OF METADATA — S1003

WAIT SELECTION OF METADATA TO BE OUTPUT FROM SECOND OUTPUT CIRCUIT — S1004

DETERMINE METADATA TO BE OUTPUT FROM SECOND OUTPUT CIRCUIT — S1005

TRANSMIT REQUEST FOR METADATA TO BE OUTPUT FROM SECOND OUTPUT CIRCUIT — S1006

END

IMAGE CAPTURE APPARATUS, CONTROL METHOD THEREFOR, IMAGE PROCESSING APPARATUS, AND IMAGE PROCESSING SYSTEM

CROSS-REFERENCE TO RELATED APPLICATION

This application is a continuation of application Ser. No. 17/887,717, filed Aug. 15, 2022, the entire disclosure of which is hereby incorporated by reference.

BACKGROUND OF THE INVENTION

Field of the Invention

The present invention relates to an image capture apparatus, a control method therefor, an image processing apparatus, and an image processing system.

Description of the Related Art

Visual Effects (VFX) techniques have been drawing attention. VFX is a technique to generate videos of unrealistic scenes by compositing computer graphics (CG) over live-action videos. Although it has been common to composite CG during post-production of a live-action video, there are increasing needs for real-time checking of a composite video by compositing CG prepared in advance while a shooting.

In a case where CG is composited over a live-action video in real time, metadata, which is transmitted by an image capture apparatus together with the live-action video, is used. Conventionally, it is known that such metadata is transmitted, for example, by multiplexing with video signals in a blanking period of the video signals (Japanese Patent Laid-Open No. 2019-75633).

However, the size, data format, and the like of a region that can be used in transmission of metadata varies among formats of image data (video signals). Therefore, in a case where the format of image data output from an image capture apparatus has been changed using a converter and the like, metadata may not be transmitted accurately.

SUMMARY OF THE INVENTION

The present invention, in one aspect thereof, provides an image capture apparatus that outputs image data obtained through image capture and metadata generated at the time of image capture of the image data to the outside, wherein the image capture apparatus allows the metadata to be used accurately even if the format of image data has been changed after the image data is output from the image capture apparatus.

According to an aspect of the present invention, there is provided an image capture apparatus, comprising: an obtainment circuit that obtains image data captured using an image sensor; a metadata generation circuit that generates, as metadata, information relating to a state of the image capture apparatus at the time of capturing the image data as well as to the image data; a first output circuit for outputting the image data in a first format to an external apparatus; and a second output circuit for outputting a part of the metadata in a second format to the external apparatus, the second output circuit being different from the first output circuit.

According to another aspect of the present invention, there is provided an image processing apparatus connected to an image capture apparatus in a communication-enabled manner, wherein the image capture apparatus comprising: an obtainment circuit that obtains image data captured using an image sensor; a metadata generation circuit that generates, as metadata, information relating to a state of the image capture apparatus at the time of capturing the image data as well as to the image data; a first output circuit for outputting the image data in a first format to an external apparatus; and a second output circuit for outputting a part of the metadata in a second format to the external apparatus, the second output circuit being different from the first output circuit, and wherein the image processing apparatus comprising: a first input circuit that receives image data that has been output from the first output circuit and then converted into a format different from the first format; a second input circuit that receives metadata in the second format that has been output from the second output circuit; and a processing circuit that applies preset processing to the image data with use of the metadata.

According to a further aspect of the present invention, there is provided an image processing system in which an image capture apparatus and an image processing apparatus are connected in a communication-enabled manner, wherein the image capture apparatus comprising: an obtainment circuit that obtains image data captured using an image sensor; a metadata generation circuit that generates, as metadata, information relating to a state of the image capture apparatus at the time of capturing the image data as well as to the image data; a first output circuit for outputting the image data in a first format to an external apparatus; and a second output circuit for outputting a part of the metadata in a second format to the external apparatus, the second output circuit being different from the first output circuit, and wherein the image processing apparatus comprising: a first input circuit that receives image data that has been output from the first output circuit and then converted into a format different from the first format; a second input circuit that receives metadata in the second format that has been output from the second output circuit; and a processing circuit that applies preset processing to the image data with use of the metadata.

According to another aspect of the present invention, there is provided a control method for an image capture apparatus, comprising: obtaining image data captured using an image sensor; generating, as metadata, information relating to a state of the image capture apparatus at the time of capturing the image data as well as to the image data; outputting the image data in a first format from a first output circuit to an external apparatus; and outputting a part of the metadata in a second format from a second output circuit to the external apparatus, the second output circuit being different from the first output circuit.

According to a further aspect of the present invention, there is provided a non-transitory computer-readable medium having stored therein a program for causing a computer of an image capture apparatus to execute a control method for an image capture apparatus that includes a first output circuit and a second output circuit different from the first output circuit, wherein the control method comprising: obtaining image data captured using an image sensor; generating, as metadata, information relating to a state of the image capture apparatus at the time of capturing the image data as well as to the image data; outputting the image data in a first format from the first output circuit to an external apparatus; and outputting a part of the metadata in a second format from the second output circuit to the external apparatus.

Further features of the present invention will become apparent from the following description of exemplary embodiments (with reference to the attached drawings).

BRIEF DESCRIPTION OF THE DRAWINGS

FIG. 4A is a diagram showing an example of metadata output from a second output unit in the first embodiment.

FIG. 5 is a diagram showing an exemplary description of metadata output from the second output unit in the first embodiment.

FIG. 9A and FIG. 9B are diagrams showing examples of a screen displayed by the image capture apparatus 100 in the second embodiment.

FIG. 10A is a flowchart related to the operations of the image processing apparatus 200 in a third embodiment.

DESCRIPTION OF THE EMBODIMENTS

Figure 1:
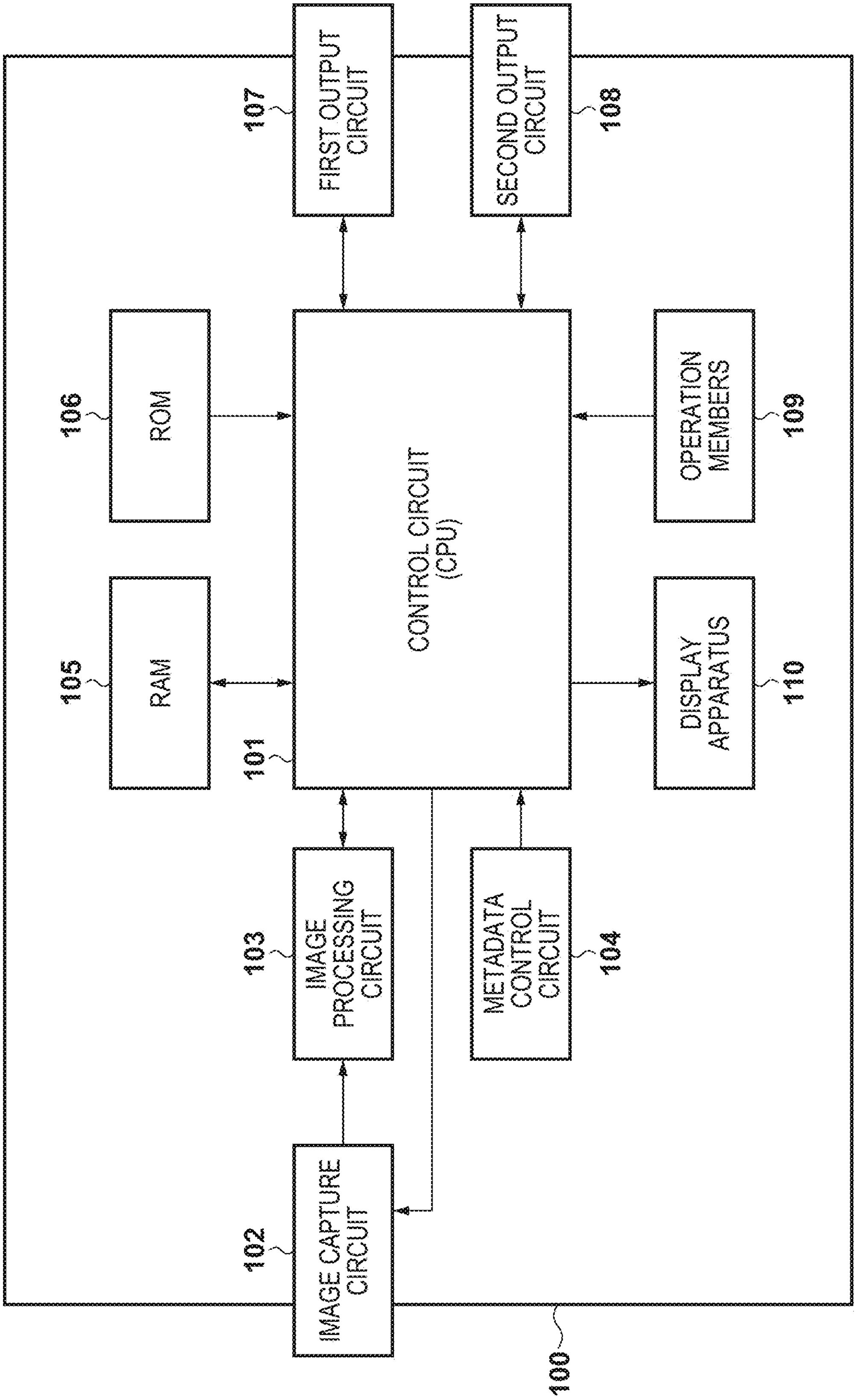
FIG. 1 is a block diagram showing an exemplary functional configuration of an image capture apparatus 100 according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that the following embodiments will be described in relation to a case where the present invention is implemented on an image capture apparatus, such as a digital camera. However, the present invention can be implemented on arbitrary electronic devices that have a function of capturing moving images. Such electronic devices include a computer device (a personal computer, a tablet computer, a media player, a PDA, and so on), a mobile telephone device, a smartphone, a game device, a robot, a drone, and a driving recorder. These are examples, and the present invention can be implemented on other electronic devices.

Also, the constituents that are represented as functional blocks in the drawings may be realized by software, hardware, or a combination thereof, except for those that can be realized only by hardware. For example, functional blocks may be realized by special-purpose hardware, such as an ASIC. Furthermore, functional blocks may be realized by a processor, such as a CPU, executing a program stored in a memory. Note that a plurality of functional blocks may be realized by a mutual constituent (e.g., one ASIC). In addition, hardware that realizes a part of the functions of a certain functional block may be included in hardware that realizes another functional block.

First Embodiment

FIG. 1 is a block diagram showing an exemplary functional configuration of an image capture apparatus 100 according to a first embodiment of the present invention. A control circuit 101 is, for example, a microprocessor such as a CPU, reads a program stored in a ROM 106 into a RAM 105, and then executes the program. The control circuit 101 realizes the functions of the image capture apparatus 100 by controlling the operations of each functional block.

The ROM 106 is, for example, a rewritable nonvolatile memory, and stores a program that can be executed by the control circuit 101, setting values, GUI data, and the like.

The RAM 105 is used to read in a program to be executed by the control circuit 101, and store necessary values during the execution of a program. Furthermore, the RAM 105 is also used as a working memory for the control circuit 101, an image processing circuit 103, and a metadata control circuit 104. In addition, a part of the region of the RAM 105 is used as a video memory for a display apparatus 110.

An image capture circuit 102 includes an image capture optical system and an image sensor. Under control of the control circuit 101, the image capture circuit 102 captures still images or moving images, and outputs image signals to the image processing circuit 103. The image capture optical system includes a movable lens for adjusting the focus distance and changing the field of view. The operations of the movable lens are controlled by the control circuit 101. Also, in a case where the image capture circuit 102 includes a diaphragm and a mechanical shutter, their operations are also controlled by the control circuit 101. The image capture optical system may be attachable/removable, or may be integrated within the image capture apparatus 100.

The image processing circuit 103 generates signals and image data and obtains and/or generates various types of information by applying preset image processing to image signals output from the image capture circuit 102. The image processing circuit 103, for example, may be a special-purpose hardware circuit, such as an ASIC, that is designed to realize specific functions, or may be configured to realize specific functions along with the execution of software by a programmable processor, such as a DSP.

Image processing applied by the image processing circuit 103 includes preprocessing, color interpolation processing, correction processing, detection processing, data editing processing, evaluation value calculation processing, special effects processing, and the like.

Preprocessing includes signal amplification, reference level adjustment, defective pixel correction, and the like.

Color interpolation processing is processing for interpolating the values of color components that cannot be obtained at the time of shooting, and is also referred to as demosaicing processing.

Correction processing includes processing such as white balance adjustment, tone correction, correction of image deterioration caused by optical aberration of the image capture optical system (image recovery), correction of the influence of vignetting of the image capture optical system, color correction, and the like.

Detection processing includes detection of a characteristic region (e.g., a face region and a human body region) and movements thereof, processing for recognizing a person, and the like.

Data editing processing includes processing such as composition, scaling, encoding and decoding, generation of header information (generation of a data file), and the like. Data editing processing also includes generation of image data corresponding to an intended use such as display, recording, and external output.

Evaluation value calculation processing includes processing such as generation of signals and evaluation values used in automatic focus detection (AF), and generation of evaluation values used in automatic exposure control (AE).

Special effects processing includes, for example, processing such as addition of blur effects, changing of tones, and relighting.

Note that these are examples of processing that can be applied by the image processing circuit 103, and do not limit processing that is applied by the image processing circuit 103.

In parallel with the image capture performed by the image capture circuit 102, the metadata control circuit 104 (metadata generation means) generates information (metadata) related to image data, which has been generated based on the image capture, and the image capture apparatus 100 at the time of the image capture. Metadata can include, but is not limited to, a time code, a time period of recording, image capture conditions (the focal length, film speed, and shutter speed (exposure time, frame rate, etc.) of the image capture optical system), the orientation of the image capture apparatus 100, and so on. Also, the metadata control circuit 104 extracts, from the generated metadata, preset metadata to be used in real-time composition processing.

A first output circuit 107 adds, to image data that has been generated by the image processing circuit 103 based on image capture performed by the image capture circuit 102, metadata related to the image data, and outputs the resultant image data to an external apparatus (image processing apparatus 200). Here, as one example, it is assumed that the first output circuit 107 outputs the image data in a format that conforms to an SDI (Serial Digital Interface) standard.

A second output circuit 108 outputs metadata generated by the metadata control circuit 104 to an external apparatus (the image processing apparatus 200). Metadata output from the second output circuit 108 includes at least metadata to be used in real-time composition processing of image data (e.g., a time code, lens information, etc.). Here, as one example, it is assumed that the second output circuit 108 outputs metadata in a format based on the UDP (User Datagram Protocol) on Ethernet®.

The above-mentioned transmission standard and communication protocol used by the first output circuit 107 and the second output circuit 108 are merely examples, and other transmission standards and communication protocols may be used. Also, the communication medium may be wireless or wired. The first output circuit 107 and the second output circuit 108 include constituents (connectors, antennas, transmission/reception circuits, etc.) that conform to the transmission standard used.

Operation members 109 are a collective term for various input devices (buttons, switches, dials, etc.) mounted on the image capture apparatus 100. For example, the operation members 109 include a release switch, a moving image recording switch, a shooting mode selection dial for selecting a shooting mode, a menu button, direction keys, a confirmation key, and so on. Note that the functions assigned to the same input device may be variable. Also, the input devices may be software buttons or keys that use a touch-screen display.

The control circuit 101 executes an operation corresponding to an operation performed on the operation members 109. For example, the control circuit 101 recognizes a half-pressed state of the release switch as an instruction for preparation of a still-image shooting, and a fully-pressed state of the release switch as an instruction for starting a still-image shooting, and executes corresponding operations. Also, the control circuit 101 recognizes depression of the moving image recording switch in a shooting standby state as an instruction for starting the recording of moving images, and recognizes depression of the moving image recording switch during the recording of moving images as an instruction for stopping the recording, and executes corresponding operations.

The display apparatus 110 is a display apparatus that displays images captured by the image capture circuit 102, reproduced images, the settings and the states of the image capture apparatus 100, a graphical user interface (GUI) such as a menu screen, and so on. The operations of the display apparatus 110 are controlled by the control circuit 101.

Figure 2:
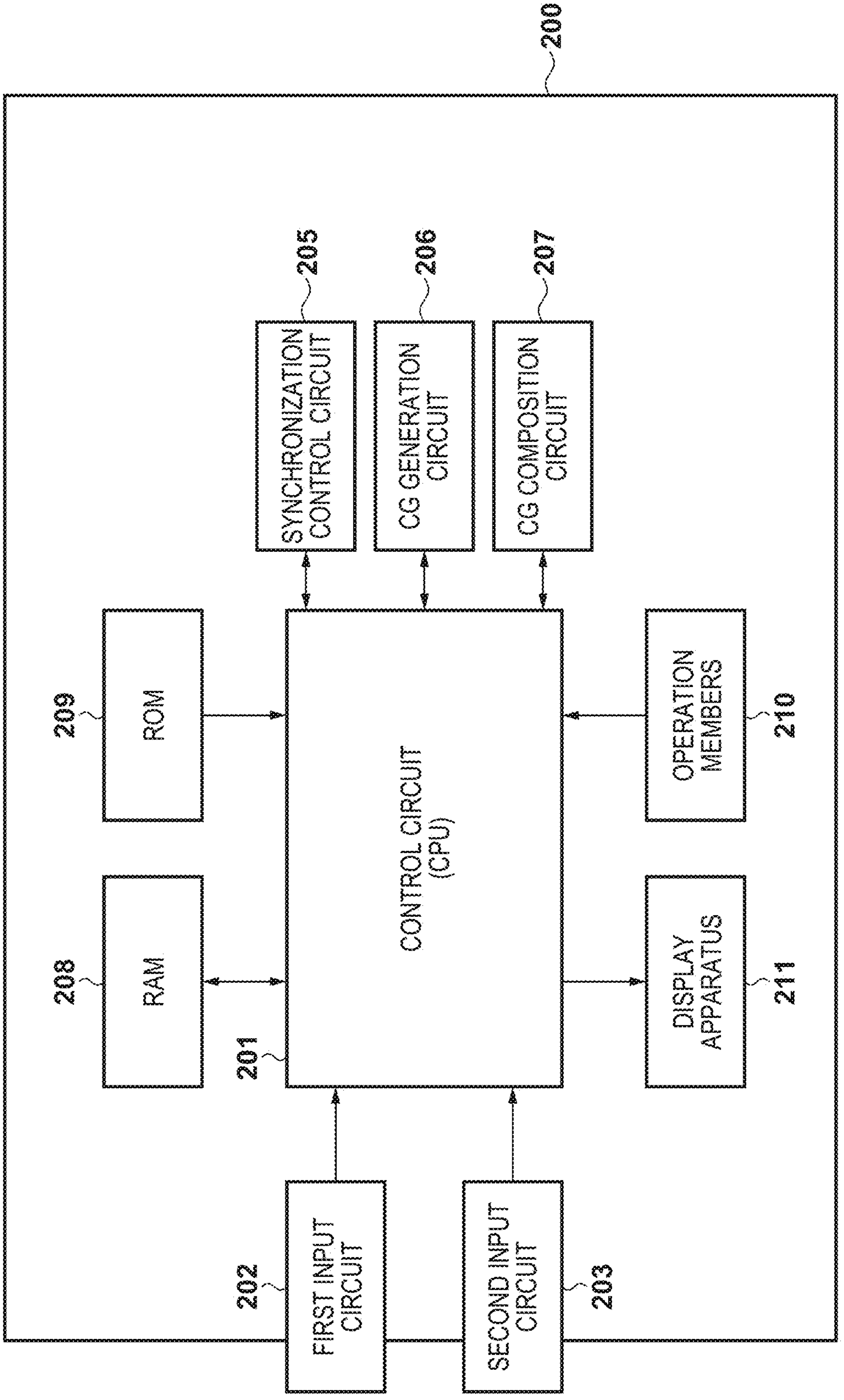
FIG. 2 is a block diagram showing an exemplary functional configuration of an image processing apparatus 200 according to an embodiment of the present invention.

FIG. 2 is a block diagram showing an exemplary functional configuration of the image processing apparatus 200 that composites CG data with image data with use of image data and metadata output from the first output circuit 107 and the second output circuit 108 of the image capture apparatus 100. The image processing apparatus 200 may be, for example, a general-purpose computer device, such as a personal computer and a tablet computer. The image processing apparatus 200 and the image capture apparatus 100 compose an image processing system in a state where they are connected in a communication-enabled manner.

A control circuit 201 is, for example, a microprocessor such as a CPU, reads a program stored in a ROM 209 into a RAM 208, and then executes the program. The control circuit 201 realizes the functions of the image processing apparatus 200 by controlling the operations of each functional block.

The ROM 209 is, for example, a rewritable nonvolatile memory, and stores a program that can be executed by the control circuit 201 (an OS, an application, etc.), user data, setting values, GUI data, and the like.

The RAM 208 is used to temporarily store data that has been received from the outside, read in a program to be executed by the control circuit 201, and store necessary values during the execution of a program. Furthermore, the RAM 208 is also used as a working memory for the control circuit 201, a CG generation circuit 206, and a CG composition circuit 207. In addition, a part of the region of the RAM 208 is used as a video memory for a display apparatus 211.

A first input circuit 202 is connected to the first output circuit 107 of the image capture apparatus 100 directly or indirectly. The first input circuit 202 receives image data to which metadata has been added. Here, as one example, it is assumed that the first input circuit 202 receives data in a format that conforms to the HDMI® (High-Definition Multimedia Interface) standard.

A second input circuit 203 is connected to the second output circuit 108 of the image capture apparatus 100 directly or indirectly, and receives metadata. Here, as one example, it is assumed that the second input circuit 203 receives metadata using the UDP (User Datagram Protocol) on Ethernet®. The metadata received by the second input circuit 203 includes metadata that is used to perform real-time composition of the image data received by the first input circuit 202 and CG data.

The first input circuit 202 and the second input circuit 203 include constituents (connectors, antennas, transmission/reception circuits, etc.) that conform to the transmission standard used.

A synchronization control circuit 205 controls synchronization between the metadata received by the second input circuit 203 and the image data received by the first input circuit 202.

Using the metadata received by the second input circuit 203, the CG generation circuit 206 generates CG data to be composited over the image data received by the first input circuit 202.

The CG composition circuit 207 generates composite image data by compositing the CG data generated by the CG generation circuit 206 and the image data received by the first input circuit 202.

Operation members 210 are a collective term for input devices (a keyboard, a mouse, a touchpad, etc.) for inputting an instruction to the image processing apparatus 200. Also, the input devices may be software buttons or keys that use a touchscreen display.

The control circuit 201 executes an operation corresponding to an operation performed on the operation members 210. For example, the control circuit 201 executes activation and termination of an application, an operation corresponding to an operation performed on a GUI provided by an application, and so on.

Via a GUI provided by an OS or an application, the display apparatus 211 displays the settings of the image processing apparatus 200, the image data received by the first input circuit 202, the CG generated by the CG generation circuit 206, a composite video obtained by compositing the CG over the image data in the CG composition circuit 207, and so on. The display apparatus 211 may be an external display of the image processing apparatus 200.

Figure 3:
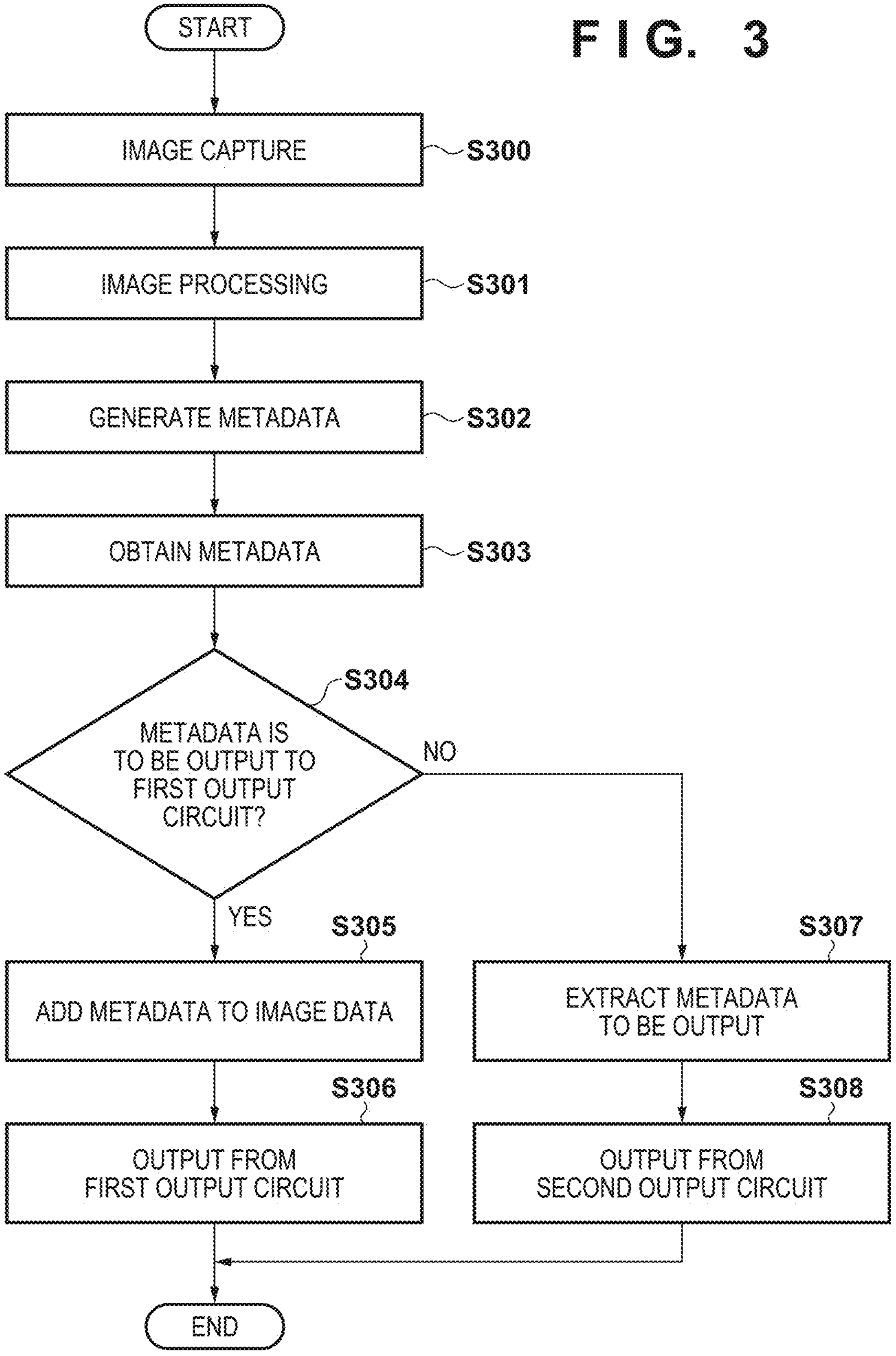
FIG. 3 is a flowchart related to the operations of the image capture apparatus 100 in a first embodiment.

The operations of the image capture apparatus 100 at the time of image capture are now described using a flowchart shown in FIG. 3. In the present embodiment, it is assumed that the image capture apparatus 100 has been set to output image data obtained through a shooting, together with metadata, to the outside in real time while performing a shooting. It is further assumed that the transmission standard (data format) for image data, the type of metadata to be output to the outside, and the like are also set in advance.

In step S300, the control circuit 101 causes the image capture circuit 102 to start image capture. The control circuit 101 controls the image capture circuit 102 to capture moving images of a preset frame rate. From then on, the image capture circuit 102 continues to capture the moving images until an instruction for terminating the image capture is issued. Also, the control circuit 101 continuously executes exposure control, as well as focus control for the image capture optical system, during the image capture based on, for example, evaluation values obtained from the image processing circuit 103.

In step S301, the control circuit 101 controls the image processing circuit 103 to generate image data in a format to be output to the outside from image signals of each frame output from the image capture circuit 102. The image processing circuit 103 generates image data in a format that conforms to the output settings by applying necessary image processing to the image signals. The image processing circuit 103 sequentially stores the generated image data into the RAM 105.

In step S302, the control circuit 101 causes the metadata control circuit 104 to start generating metadata. The metadata control circuit 104 generates preset metadata, which includes metadata to be appended to the image data stored in the RAM 105 and metadata to be used in real-time composition. As the metadata can be generated using any known method, a description of the details thereof is omitted. Note that the metadata to be used in real-time composition includes, for example, information related to the image capture optical system (lens information), information related to the orientation of the image capture apparatus 100, and the like. The metadata control circuit 104 stores the generated metadata into the RAM 105.

In step S303, the control circuit 101 sequentially obtains the metadata generated by the metadata control circuit 104 from the RAM 105.

In step S304, the control circuit 101 determines whether the obtained metadata is metadata to be output from the first output circuit 107. With respect to each piece of metadata, the control circuit 101 supplies it to the first output circuit 107 if it is the metadata to be output from the first output circuit 107, and supplies it to the second output circuit 108 if it is not the metadata to be output from the first output circuit 107.

Note, it is assumed that the relationship between the types of metadata and corresponding output units is, for example, registered ahead of time in the ROM 106 in the form of a table. Also note, metadata is associated with at least one of the first output circuit 107 and the second output circuit 108, and may be associated with both of the output units.

For example, metadata that is used to associate (synchronize) image data output from the first output circuit 107 with metadata output from the second output circuit 108 may be associated with both of the first output circuit 107 and the second output circuit 108. An example of such metadata is a time code.

Note that the synchronization between image data output from the first output circuit 107 and metadata output from the second output circuit 108 is not limited to being established using a method in which the same metadata is associated with both of the output units, but may be established using another method. For example, a frame number may be included in metadata output from the second output circuit 108, so that it is possible to specify to which one of the frames of image data output from the first output circuit 107 the metadata corresponds.

Also, only the types of metadata to be output to the first output circuit 107 may be registered, and metadata that has not been registered may be supplied to the second output circuit 108. Furthermore, a user may be allowed to change the correspondence relationship between metadata and the output units.

Steps S305 and S306 are processing of the first output circuit 107, and steps S307 and S308 are processing of the second output circuit 108.

In step S305, the first output circuit 107 generates output data that conforms to the output format by adding the metadata supplied from the control circuit 101 to moving image data stored in the RAM 105. Here, it is assumed that the first output circuit 107 generates output data in the SDI format to which the metadata has been added as ancillary data.

In step S306, the first output circuit 107 outputs the output data generated in step S305 to the outside.

In step S307, the second output circuit 108 extracts, from the metadata supplied from the control circuit 101, metadata to be output. It is assumed that which metadata is to be output is set in advance. The metadata to be output includes at least metadata that is necessary to perform real-time composition processing with respect to image data output from the first output circuit 107 and CG data, and metadata for associating the output of the first output circuit 107 with the output of the second output circuit 108.

Note that which metadata is necessary for the real-time composition processing may be sent from a receiver apparatus that executes the composition processing (here, the image processing apparatus 200) to the image capture apparatus 100 as a notification, or may be registered in the image capture apparatus 100 in advance. For example, once the image processing apparatus 200 has executed an application for carrying out the real-time composition processing, the control circuit 201 notifies the control circuit 101 of information related to necessary metadata. The control circuit 101 may register the types of metadata notified from the control circuit 201 with the second output circuit 108, or may store them into, for example, the RAM 105 so that the second output circuit 108 can refer to them.

In step S308, the second output circuit 108 stores the metadata extracted in step S307 into a UDP packet, and outputs the same.

From then on, the aforementioned operations are continuously executed until a condition for stopping the external output is satisfied, such as the issuance of a user instruction. While metadata is generated and output in parallel with image capture in the present embodiment, no limitation is intended by this; it is possible to adopt a configuration in which metadata is generated and output only with respect to recorded frames in response to a recording instruction for recording image data obtained through image capture. That is to say, when an instruction for starting the recording has been accepted in step S300, the operations of step S301 onward may be started with respect to image data to be recorded, and thereafter, the operations of steps S301 to S308 may be executed continuously until an instruction for stopping the recording is accepted.

FIG. 4A is a diagram showing one example of metadata that is output from the second output circuit 108 per frame of image data. The metadata includes management information which is information related to moving images, lens information which is information related to the states of the image capture optical system at the time of shooting, exposure information which is information related to exposure conditions at the time of shooting, camera orientation information which is information related to the orientation of the image capture apparatus 100 at the time of shooting, and facial detection information. These are examples; other information may be included, and a part of the information shown in FIG. 4A may not be included. In the present example, a time code is included as metadata for associating the output of the first output circuit 107 and the output of the second output circuit 108.

Figure 4B:
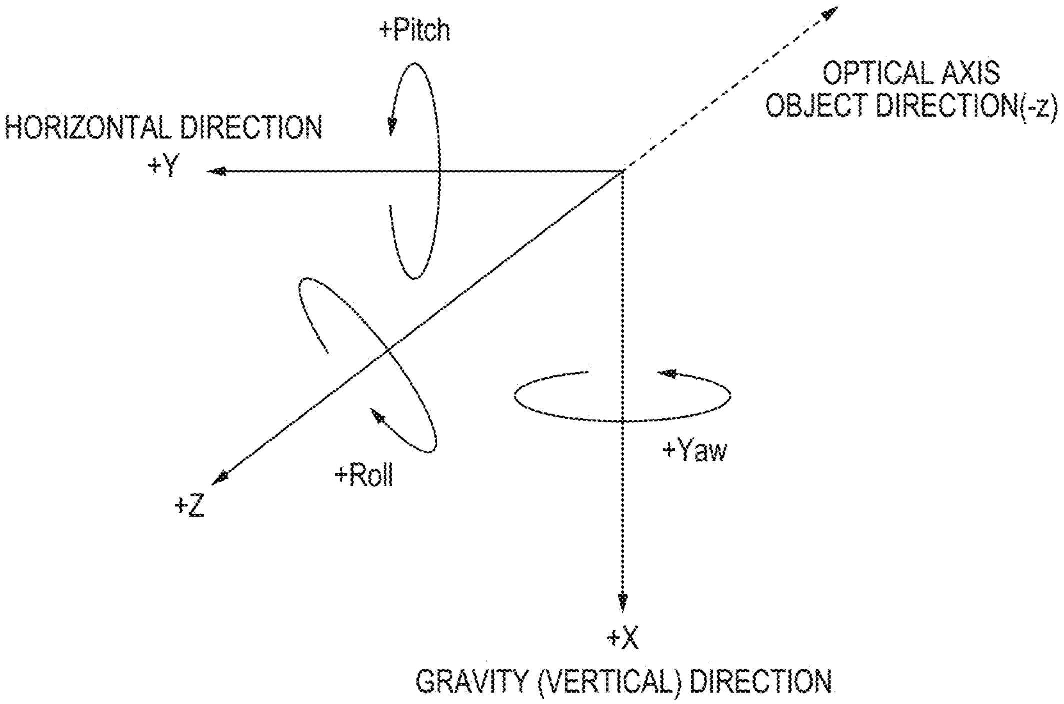
FIG. 4B is a diagram related to camera orientation information included in the metadata of FIG. 4A.

FIG. 4B is a diagram showing the definitions of pitch, yaw, and roll described in FIG. 4A. The orientation of the image capture apparatus 100 is represented using three-dimensional coordinates based on the three axes of an absolute coordinate system and the absolute rotation angles around the respective axes. The absolute coordinate system is a fixed coordinate system in which, once it has been set, the position of the origin and the directions of the coordinate axes do not change; here, it is assumed that the absolute coordinate system is a coordinate system for a case where the image capture apparatus 100 is set horizontally with respect to the earth. A coordinate system in which movements and rotations are possible, as with an inertial sensor, is a sensor coordinate system. The axis representing the gravity direction of the earth is the X axis, and a horizontal rotation angle around the X axis is a yaw angle. Also, the optical axis for the case where the image capture apparatus 100 is set horizontally with respect to the earth is the Z axis, and a rotation angle around the Z axis is a roll angle. The axis perpendicular to the X axis and the Z axis is the Y axis, and a rotation angle around the Y axis is a pitch angle. Each of the yaw angle, pitch angle, and roll angle in the absolute coordinate system is the Euler angle.

FIG. 5 depicts an example in which the metadata shown in FIG. 4A is described in a JSON (JavaScript Object Notation) format. This is one example of description methods that can be used in transmitting the metadata, and the metadata may be described using another description method, such as XML.

Figure 6:
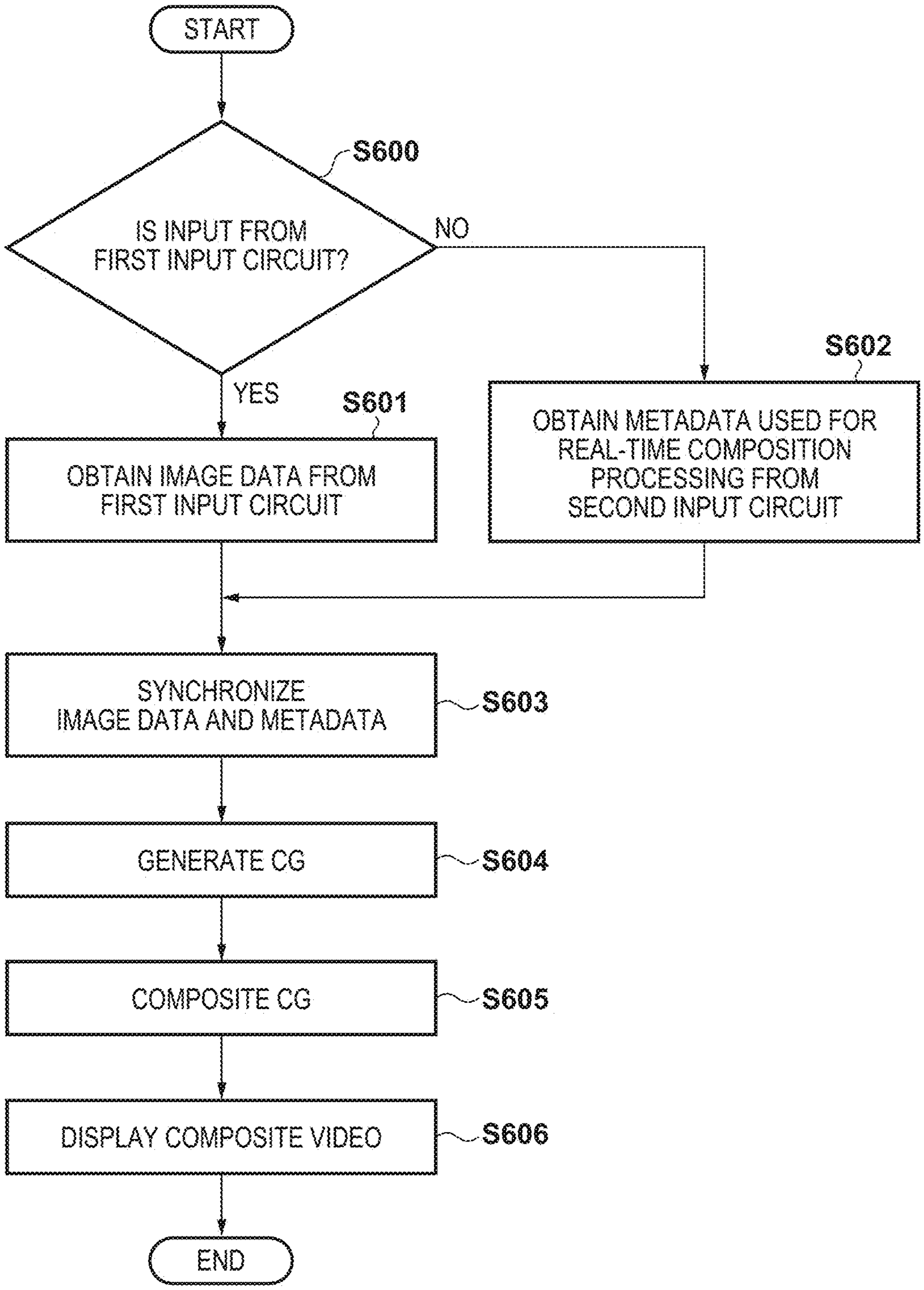
FIG. 6 is a flowchart related to the operations of the image processing apparatus 200 in the first embodiment.

Using a flowchart shown in FIG. 6, a description is now given of the operations of the image processing apparatus 200 to receive image data and metadata that are output from the image capture apparatus 100 through the operations of FIG. 3, and apply real-time composition processing. It is assumed that the image processing apparatus 200 and the image capture apparatus 100 are in a state where they are mutually connected in a communication-enabled manner via the first output circuit 107 and the first input circuit 202, and via the second output circuit 108 and the second input circuit 203. Also, it is assumed that image data in the SDI format output from the first output circuit 107 of the image capture apparatus 100 is converted into the HDMI format by a converter and the like before arriving at the first input circuit 202. Furthermore, it is assumed that, among metadata added to the image data of the SDI format, at least a time code can be accurately recognized even after conversion into the HDMI format.

The operations shown in FIG. 6 are realized by the control circuit 201 executing a real-time composition processing application stored in the ROM 209 in a state where the image processing apparatus 200 and the image capture apparatus 100 are connected in a communication-enabled manner.

In step S600, upon receiving data from an external apparatus (the image capture apparatus 100) via the first input circuit 202 or the second input circuit 203, the control circuit 201 determines whether the data is the input from the first input circuit 202. When it is determined that the data is the input from the first input circuit 202, step S601 is executed; when it is not thus determined (when it is determined that the data is the input from the second input circuit 203), step S602 is executed.

In step S601, the control circuit 201 receives image data to which metadata has been added via the first input circuit 202, and stores the image data into the RAM 208.

In step S602, the control circuit 201 receives metadata via the second input circuit 203, and stores the metadata into the RAM 208.

Note that hereafter, processing from step S600 to step S602 is continuously executed in parallel with processing of step S603 onward.

In step S603, the control circuit 201 instructs the synchronization control circuit 205 to start processing for synchronizing the image data received via the first input circuit 202 with the metadata received via the second input circuit 203. The synchronization control circuit 205 starts the execution of the synchronization processing in response to the instruction.

In a case where the second output circuit 108 of the image capture apparatus 100 transmits the metadata of FIG. 4A, the synchronization control circuit 205 can synchronize the image data and the metadata with each other by cross-referencing the time code added to the image data with the time code of the metadata received via the second input circuit 203. As stated earlier, synchronization can be established using another method as well.

Based on the image data and the metadata that have been synchronized by the synchronization control circuit 205, the control circuit 201 supplies image data corresponding to one frame to the CG composition circuit 207, and supplies corresponding metadata to the CG generation circuit 206.

In step S604, the CG generation circuit 206 generates CG data to be composited over the image data with use of the metadata. For example, the CG generation circuit 206 renders pre-prepared model data of CG in consideration of, for example, orientation information and lens information of the image capture apparatus at the time of shooting, thereby generating data of CG that does not look strange when composited over the image data. The CG generation circuit 206 supplies the generated CG data to the CG composition circuit 207 via the control circuit 201.

In step S605, the CG composition circuit 207 composites together the image data corresponding to one frame supplied from the control circuit 201 in step S603 and the CG data generated by the CG generation circuit 206 in step S604, thereby generating composite image data corresponding to one frame. The CG composition circuit 207 outputs the composite image data to the control circuit 201.

In step S606, the control circuit 201 stores the composite image data corresponding to one frame generated by the CG composition circuit 207 into a video memory region of the RAM 105, and displays the same on the display apparatus 211.

From then on, the aforementioned operations are continuously executed until a condition for stopping the composition processing is satisfied.

Figure 7:
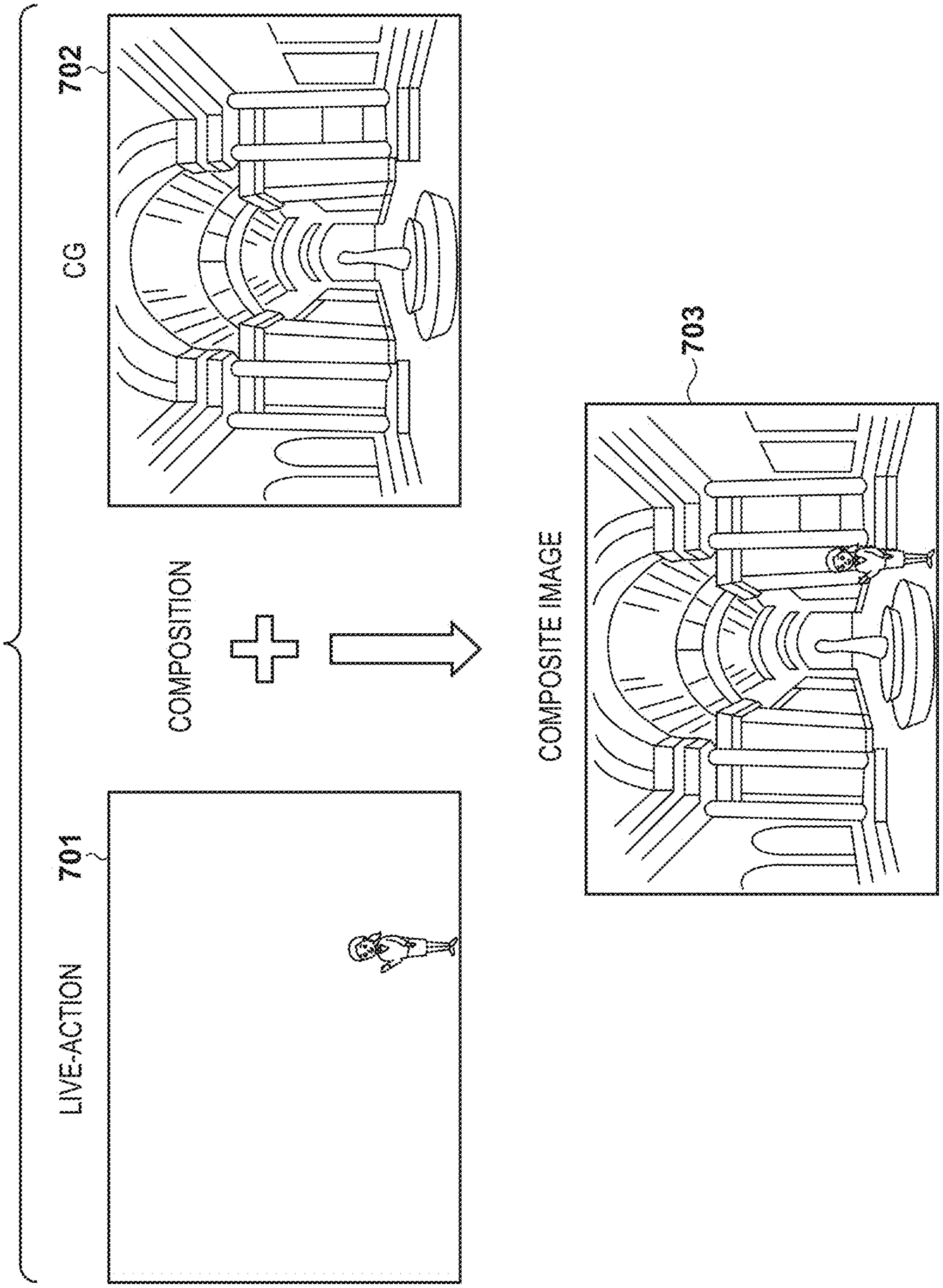
FIG. 7 is a diagram schematically showing composition processing of the image processing apparatus 200 in the first embodiment.

FIG. 7 is a diagram schematically showing the composition of live-action image data and CG data. Live-action image data 701, which is obtained by way of shooting with a blue screen or a green screen in the image capture circuit 102 of the image capture apparatus 100, is output from the first output circuit 107. Also, a group of metadata pieces including metadata necessary for composition processing and synchronization processing is output from the second output circuit 108.

The image processing apparatus 200 receives image data via the first input circuit 202, and receives metadata via the second input circuit 203. Then, the image data and the metadata are synchronized with each other, and corresponding metadata is specified on a per-frame basis. Using metadata, the CG generation circuit 206 generates CG data 702 to be composited over the background of the live-action image. Composite image data 703 is obtained by compositing together the live-action image data 701 and the CG data 702 in the CG composition circuit 207.

Note that in order to facilitate the description and understanding of the invention, the present embodiment has been described mainly in relation to a case where metadata necessary for real-time composition processing is output from the second output circuit 108. However, the problem that metadata added to image data cannot be accurately used on the receiver side due to the format conversion of the image data, is not confined to real-time composition processing.

Therefore, the nature of the present invention lies in that a part of a plurality of types of metadata pieces that are generated at the time of image capture is output from an output unit different from an output unit that outputs image data, without being added to the image data.

As described above, according to the present embodiment, a part of a plurality of types of metadata pieces that are generated in the image capture apparatus at the time of image capture is output from an output unit that is separate from an output unit that outputs image data. In this way, even if metadata added to the image data becomes no longer maintained as a result of conversion of the format of the image data, the receiving apparatus can accurately use the metadata generated by the image capture apparatus.

Second Embodiment

Next, a second embodiment of the present invention will be described. The present embodiment is the same as the first embodiment, except for the operations of the image capture apparatus at the time of image capture. Therefore, the following description focuses on the points that are different from the first embodiment.

Figure 8:
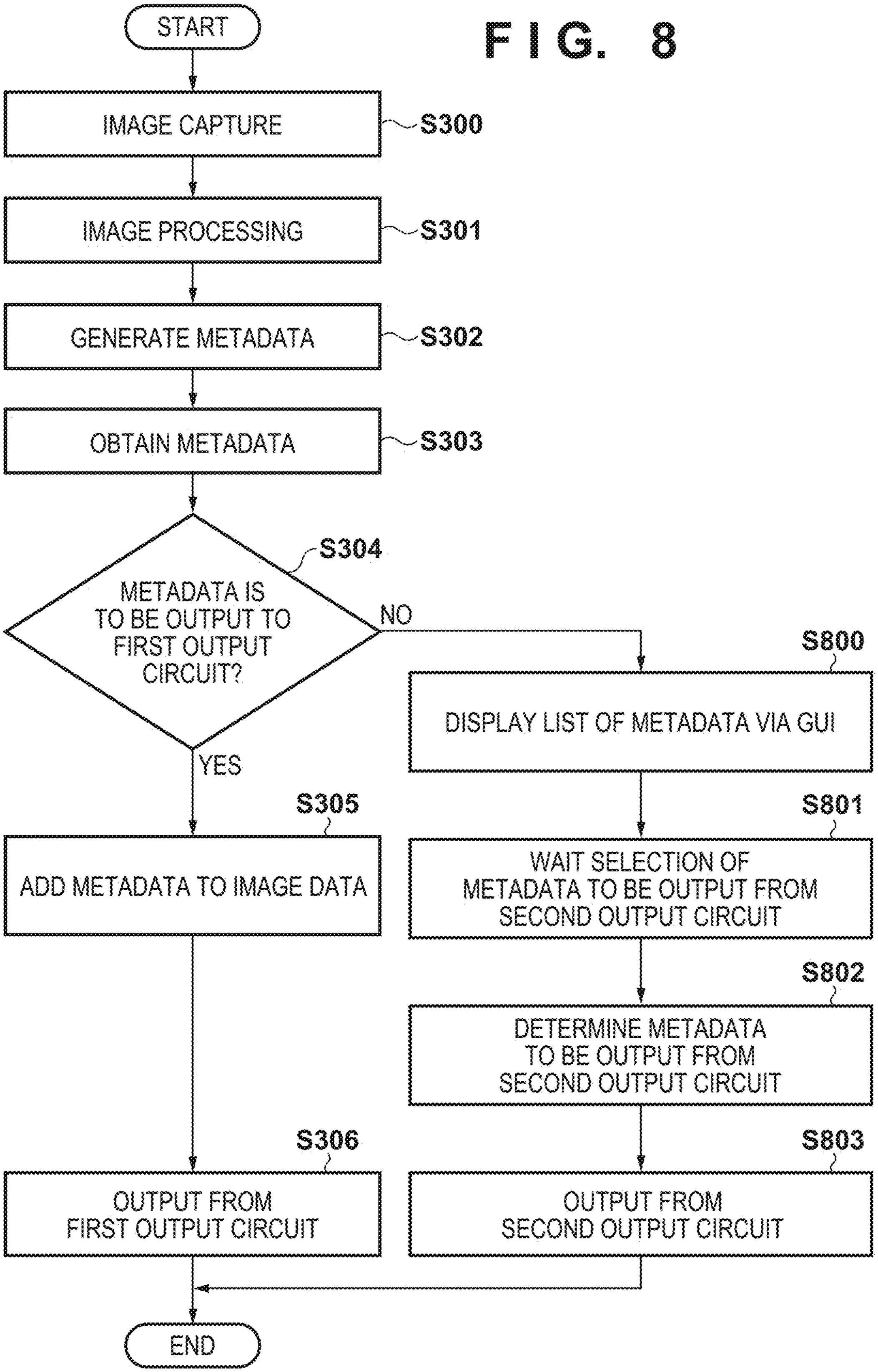
FIG. 8 is a flowchart related to the operations of the image capture apparatus 100 in a second embodiment.

FIG. 8 is a flowchart related to the operations of the image capture apparatus 100 according to the present embodiment at the time of image capture; the processes that perform processing similar to that of the first embodiment are given the same reference numerals as FIG. 3, and a description thereof is omitted. As apparent from comparison between FIG. 3 and FIG. 8, the present embodiment differs in the operations related to metadata that has been assigned to the second output circuit 108 in step S304.

In step S800, the control circuit 101 causes the display apparatus 110 to display a selection screen that allows a user to select metadata to be output from the second output circuit 108 from among the metadata that has been assigned to the second output circuit 108.

FIGS. 9A and 9B are diagrams showing a metadata selection screen displayed in step S800 and exemplary metadata descriptions (the JSON format) that are generated in response to a selection on the metadata selection screen.

A metadata selection screen 901 is, for example, provided as an "output metadata" setting screen, which is one of hierarchically-categorized menu screens. The metadata selection screen 901 includes a region that displays a list of metadata categories, and a region that displays a list of metadata included in the category selected on the list of categories. On the metadata selection screen 901 of FIG. 9A, the category "lens information" is selected, and five types of metadata categorized as the lens information are displayed in a list in a selectable manner. Here, as all of the five types of metadata are selected, an exemplary metadata description 902 includes all of the five types of metadata categorized as the lens information.

FIG. 9B shows a metadata selection screen 903 on which the selections of a field of view, a vertical field of view, and a horizontal field of view have been removed from the state of FIG. 9A. In this case, an exemplary metadata description 904 does not include metadata related to the field of view (fov, vertical, horizontal).

Although FIGS. 9A and 9B exemplarily show the selection of metadata in the category "lens information", metadata in other categories can be similarly switched between selected and unselected states. In this way, the user can select metadata that is to be output from the second output circuit 108 separately from the image data via the metadata selection screen.

Note that metadata that must be output, such as metadata necessary for the receiving apparatus, is configured so that it is not displayed on the metadata selection screen, or the selection thereof cannot be cancelled.

In step S801, the control circuit 101 updates the display of the metadata selection screen in accordance with an operation on the metadata selection screen. Upon detection an operation of closing the metadata selection screen, the control circuit 101 executes step S802.

In step S802, the control circuit 101 determines the metadata that was in a selected state when the metadata selection screen was closed as the metadata to be output from the second output circuit 108. The control circuit 101 notifies the second output circuit 108 of information related to the determined metadata.

Step S803 is equivalent to the processing of steps S307 and S308 of the first embodiment. That is to say, the second output circuit 108 extracts the metadata notified in step S802 from the metadata supplied from the control circuit 101. Then, the second output circuit 108 stores the extracted metadata into a UDP packet, and outputs the same.

Note that it is sufficient to execute the processing of steps S800 to S802 when metadata is transmitted from the second output circuit 108 first. Thereafter, for example, in a case where the metadata that has not been selected becomes necessary on the receiving device side, the types of metadata to be output can be changed by calling up the metadata selection screen from a menu screen and changing the settings.

The present embodiment can realize the advantageous effect of enabling the user to set metadata to be output from the second output circuit 108, in addition to the advantageous effects of the first embodiment.

Third Embodiment

Next, a third embodiment of the present invention will be described. In the present embodiment, the image processing apparatus 200 transmits, to the image capture apparatus 100, a request for metadata output from the second output circuit 108. The configurations of the image capture apparatus 100 and the image processing apparatus 200 are as described in the first embodiment, and thus the following description relates only to the operations thereof.

In the present embodiment, it is necessary that the image capture apparatus 100 and the image processing apparatus 200 be bidirectionally connected in a communication-enabled manner. Here, it is assumed that the second output circuit 108 and the second input circuit 203 are bidirectionally connected in a communication-enabled manner. Note that bidirectional communication may be performed using communication units other than the first output circuit 107, the second output circuit 108, the first input circuit 202, and the second input circuit 203 included in the image capture apparatus 100 and the image processing apparatus 200. For example, Bluetooth® communication units that are generally included in the image capture apparatus 100 and the image processing apparatus 200 may be used.

FIG. 10A is a flowchart related to the operations of the image processing apparatus 200 in the present embodiment. These operations are normally implemented at an arbitrary timing before the second output circuit 108 of the image capture apparatus 100 starts outputting metadata to the image processing apparatus 200. However, the implementation at other timings are not excluded.

In step S1000, upon accepting an operation for requesting a selection of metadata from a user via, for example, a real-time composition processing application, the control circuit 201 requests the image capture apparatus 100 for a list of metadata that can be output.

In step S1001, the control circuit 201 determines whether the list of metadata has been received from the image capture apparatus 100 via the second input circuit 203. The control circuit 201 executes step S1002 if it is determined that the list has been received, and stands by for the reception while repeatedly executing step S1001 if it is not determined that the list has been received.

In step S1002, the control circuit 201 stores the list of metadata that has been received via the second input circuit 203 into the RAM 208.

In step S1003, the control circuit 201 generates data of a list display screen for the metadata based on the list of metadata stored in the RAM 208, and writes the data into a video memory region of the RAM 208, thereby displaying the data on the display apparatus 211. The list display screen may be a screen that includes a category region and a detail region, similarly to the metadata selection screen 901 shown in FIG. 9A.

In step S1004, the control circuit 201 updates the display of the list display screen in accordance with an operation performed on the list display screen. Upon detection an operation of closing the list display screen, the control circuit 201 executes step S1005.

In step S1005, the control circuit 201 determines the metadata that was in a selected state when the list display screen was closed as the metadata that the image capture apparatus 100 is to be requested to output from the second output circuit 108.

In step S1006, the control circuit 201 transmits, to the image capture apparatus 100, an output request including information of the metadata determined in step S1005.

Figure 10B:
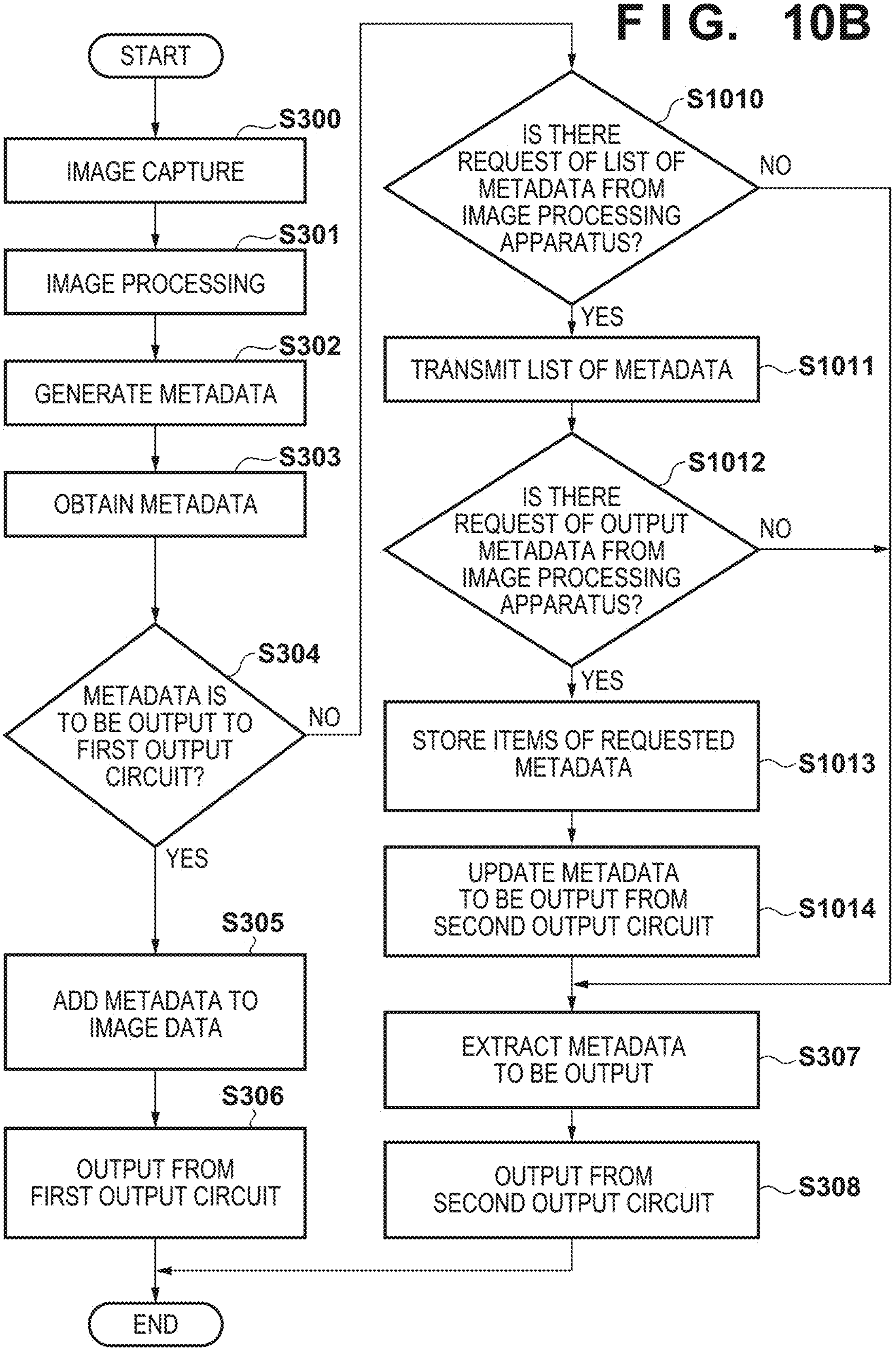
FIG. 10B is a flowchart related to the operations of the image capture apparatus 100 in the third embodiment.

FIG. 10B is a flowchart related to the operations of the image capture apparatus 100 according to the present embodiment at the time of image capture; the processes that perform processing similar to that of the first embodiment are given the same reference numerals as FIG. 3, and a description thereof is omitted. As apparent from comparison between FIG. 3 and FIG. 10B, the present embodiment differs in the operations related to metadata that has been assigned to the second output circuit 108 in step S304.

In step S1010, the control circuit 101 determines whether a request for a list of metadata has been received from the image processing apparatus 200 via the second output circuit 108. The control circuit 101 executes step S1011 if it is determined that the request for the list has been received, and causes the second output circuit 108 to execute step S307 if it is not thus determined. In this case, in step S307, the second output circuit 108 extracts metadata to be transmitted to the image processing apparatus 200 based on preset settings.

In step S1011, the control circuit 101 obtains a list of metadata that can be generated from the metadata control circuit 104, and transmits the list to the image processing apparatus 200 via the second output circuit 108 in a format that can be construed by the image processing apparatus 200.

In step S1012, the control circuit 101 determines whether a request for metadata to be output has been received from the image processing apparatus 200 via the second output circuit 108. The control circuit 101 executes step S1013 if it is determined that the request for metadata has been received, and causes the second output circuit 108 to execute step S307 if it is not thus determined. In this case, in step S307, the second output circuit 108 extracts metadata to be transmitted to the image processing apparatus 200 based on the preset settings.

In step S1013, the control circuit 101 stores information of the metadata requested by the image processing apparatus 200 into the RAM 105.

In step S1014, based on the information of the metadata stored in the RAM 105, the control circuit 101 changes the settings of metadata to be extracted by the second output circuit 108.

In step S307, in accordance with the preset settings or the settings changed in step S1014, the second output circuit 108 extracts the metadata to be output from the metadata supplied from the control circuit 101.

In step S308, the second output circuit 108 stores the metadata extracted in step S307 into a UDP packet, and outputs the same.

From then on, the aforementioned operations are continuously executed until a condition for stopping the external output is satisfied, such as the issuance of a user instruction.

According to the present embodiment, the image processing apparatus that uses metadata can request the image capture apparatus to output necessary metadata. This makes it possible to attain metadata that is necessary for the image processing apparatus without operating the image capture apparatus, in addition to the advantageous effects of the first embodiment. The usability is improved especially in a case where there is a long distance between the image processing apparatus and the image capture apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-000006, filed on Jan. 1, 2022, which is hereby incorporated by reference herein in its/their entirety.

What is claimed is:

1. An information processing apparatus, comprising:

an obtainment processor or circuit that obtains image data captured using an image sensor;

a metadata generation processor or circuit that generates, as metadata, information relating to a state of the image capture apparatus at the time of capturing the image data as well as to the image data;

a first output processor or circuit that outputs the image data and a part of the metadata in a first format to an external apparatus, wherein the first format conforms to Serial Digital Interface (SDI) standard and the part of metadata is added as ancillary data; and a second output processor or circuit that outputs a part of the metadata in a second format to the external apparatus, wherein the second format based on a User Datagram Protocol (UDP), and the second output processor or circuit is different from the first output processor or circuit.

2. The information processing apparatus according to claim 1, wherein the part of the metadata has been added to the image data in an output of the first output processor or circuit.

3. The information processing apparatus according to claim 1, wherein (i) the part of the metadata output from the first output processor or circuit to the external apparatus and (ii) the metadata output from the second output processor or circuit to the external apparatus include a same metadata.

4. The information processing apparatus according to claim 1, wherein the image data is data of moving images, and the metadata generation processor or circuit generates the metadata per frame of the moving images.

5. The information processing apparatus according to claim 1, wherein the metadata output from the second output processor or circuit includes metadata for establishing synchronization between the image data output from the first output processor or circuit and the metadata output from the second output processor or circuit.

6. The information processing apparatus according to claim 5, wherein the metadata for establishing synchronization is a time code or a frame number.

7. The information processing apparatus according to claim 1, wherein the metadata output from the second output processor or circuit is metadata that has been selected by a user via a selection screen.

8. The information processing apparatus according to claim 1, wherein the metadata output from the second output processor or circuit is metadata requested by the external apparatus.

9. The information processing apparatus according to claim 1, wherein the metadata output from the second output processor or circuit is metadata that is necessary for the external apparatus to composite CG data with the image data output from the first output processor or circuit.

10. The information processing apparatus according to claim 1, wherein the second output processor or circuit outputs the metadata on Ethernet.

11. An image processing apparatus connected to an information processing apparatus in a communication-enabled manner, wherein the information processing apparatus comprising:

an obtainment processor or circuit that obtains image data captured using an image sensor;

a metadata generation processor or circuit that generates, as metadata, information relating to a state of the image capture apparatus at the time of capturing the image data as well as to the image data;

a first output processor or circuit that outputs the image data and a part of the metadata in a first format to an external apparatus, wherein the first format conforms to Serial Digital Interface (SDI) standard and the part of metadata is added as ancillary data; and a second output processor or circuit that outputs a part of the metadata in a second format to the external apparatus, wherein the second format based on a User Datagram Protocol (UDP), and the second output processor or circuit is different from the first output processor or circuit, and wherein the image processing apparatus comprising:

a first input processor or circuit that receives the image data and the part of the metadata that have been output from the first output processor or circuit and then converted into a format different from the first format; and a second input processor or circuit that receives the part of the metadata in the second format that has been output from the second output processor or circuit.

12. The image processing apparatus according to claim 11, further comprising a synchronization processor or circuit that synchronizes the part of the metadata received by the second input processor or circuit and the image data received by the first input processor or circuit with each other.

13. An image processing system in which an information processing apparatus and an image processing apparatus are connected in a communication-enabled manner, wherein the information processing apparatus comprising:

an obtainment processor or circuit that obtains image data captured using an image sensor;

a metadata generation processor or circuit that generates, as metadata, information relating to a state of the image capture apparatus at the time of capturing the image data as well as to the image data;

a first output processor or circuit that outputs the image data and a part of the metadata in a first format to an external apparatus, wherein the first format conforms to Serial Digital Interface (SDI) standard and the part of metadata is added as ancillary data; and a second output processor or circuit that outputs a part of the metadata in a second format to the external apparatus, wherein the second format based on a User Datagram Protocol (UDP), and the second output processor or circuit is different from the first output processor or circuit, and wherein the image processing apparatus comprising:

a first input processor or circuit that receives the image data and the part of the metadata that have been output from the first output processor or circuit and then converted into a format different from the first format; and a second input processor or circuit that receives the part of the metadata in the second format that has been output from the second output processor or circuit.

14. A control method for an information processing apparatus, comprising:

obtaining image data captured using an image sensor;

generating, as metadata, information relating to a state of the image capture apparatus at the time of capturing the image data as well as to the image data;

outputting the image data and a part of the metadata in a first format to an external apparatus, wherein the first format conforms to Serial Digital Interface (SDI) standard and the part of metadata is added as ancillary data; and outputting a part of the metadata in a second format to the external apparatus, wherein the second format based on a User Datagram Protocol (UDP), and the second output processor or circuit is different from the first output processor or circuit.

15. A non-transitory computer-readable medium having stored therein a program for causing a computer of an image capture apparatus to execute a control method for an image capture apparatus that includes a first output processor or circuit and a second output processor or circuit different from the first output processor or circuit, wherein the control method comprising:

obtaining image data captured using an image sensor;

generating, as metadata, information relating to a state of the image capture apparatus at the time of capturing the image data as well as to the image data;

outputting the image data and a part of the metadata in a first format to an external apparatus, wherein the first format conforms to Serial Digital Interface (SDI) standard and the part of metadata is added as ancillary data; and outputting a part of the metadata in a second format to the external apparatus, wherein the second format based on a User Datagram Protocol (UDP), and the second output processor or circuit is different from the first output processor or circuit.

* * * * *